United States Patent [19]

Cratsa

[11] Patent Number: 4,677,783

[45] Date of Patent: Jul. 7, 1987

[54] FISHING ROD TENDER WITH AUTOMATIC FISH HOOK SETTING FEATURE

[76] Inventor: Steve N. Cratsa, 550 Foltz Dr., Verona, Pa. 15147

[21] Appl. No.: 898,244

[22] Filed: Aug. 19, 1986

[51] Int. Cl.⁴ ............................................. A01K 97/12
[52] U.S. Cl. .......................................... 43/15; 43/21.2
[58] Field of Search .................................... 43/15, 21.2

[56] References Cited

U.S. PATENT DOCUMENTS

| | | | |
|---|---|---|---|
| 3,170,262 | 2/1965 | Hall | 43/15 |
| 3,672,085 | 6/1972 | King | 43/15 |
| 3,837,109 | 9/1974 | De Julio | 43/15 |
| 3,973,346 | 8/1976 | Mason | 43/15 |
| 4,461,113 | 7/1984 | Erwin | 43/15 |

*Primary Examiner*—Gene P. Crosby
*Attorney, Agent, or Firm*—Daniel J. Long

[57] ABSTRACT

A fishing rod tender in which upper and lower pivotable plate member are positioned on a vertical support member with a spring positioned there between. A vertically pivotable rod element and a horizontally pivotable latch member are engaged to hold the device in its closed, compressed position. When fishing line is wrapped around the latch mechanism, sufficient tension on this line will pull the latch out of engagement with the rod to activate the mechanism and displace the upper plate member upwardly to set the fishing hook.

3 Claims, 4 Drawing Figures

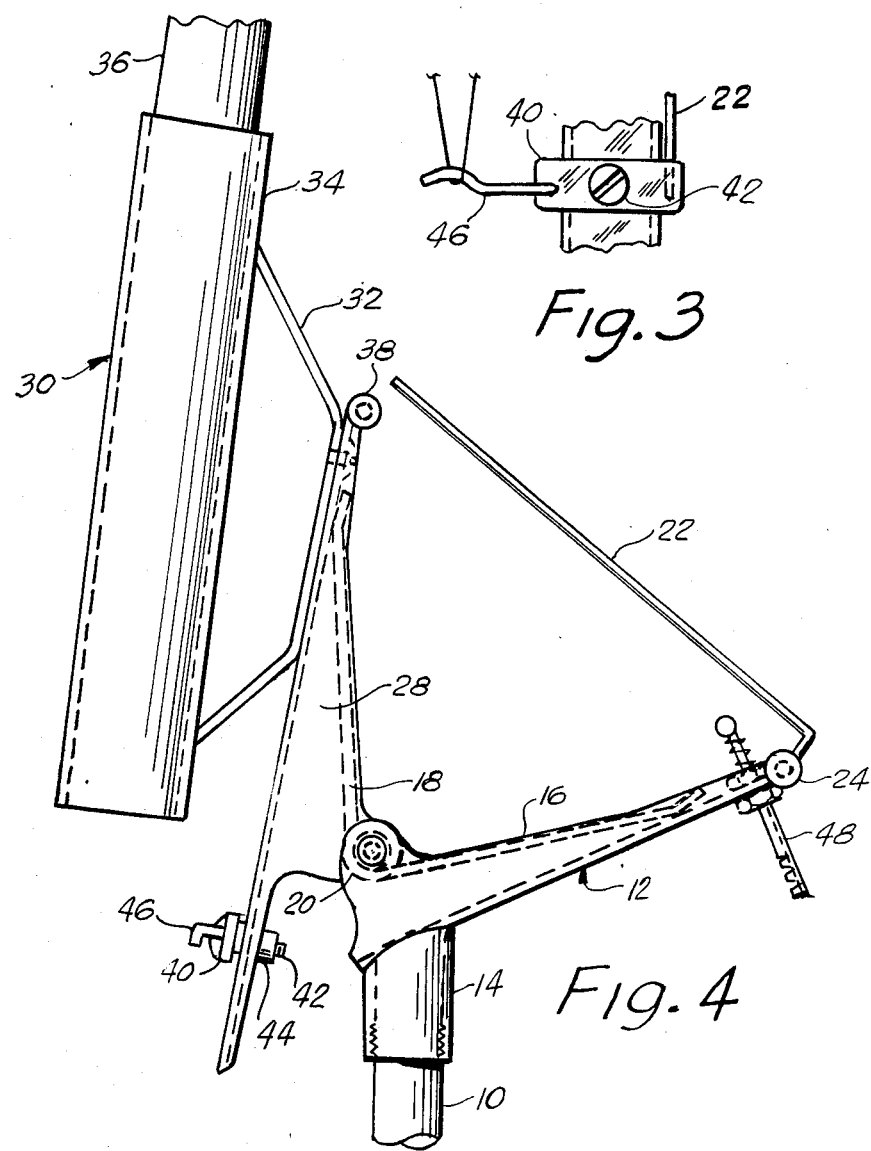

FISHING ROD TENDER WITH AUTOMATIC FISH HOOK SETTING FEATURE

BACKGROUND OF THE INVENTION

1. Field of the Invention

The present invention relates to fishing equipment and more particularly to devices for holding fishing rods and automatically setting the hook thereon in response to the tug of a fish.

2. Brief Description of the Prior Art

The prior art discloses a number of types of automatic hook setting devices. These devices characteristically make use of a bias tensioning spring and a front unlatching mechanism that is subject to the full pressure of the spring to pull the rod to a near vertical position. Such action may often necessitate a heavy fish strike or the use of hair trigger adjustments of the unlatching device. Furthermore, such devices may also be activated prematurely when mounted on dock and boats subject to wave action.

SUMMARY OF THE INVENTION

It is, therefore, the object of the present invention to provide an automatic fishing rod tender that will accommodate light to deep sea fishing rods and which can be triggered by both small and large fish.

In the rod tender of the present invention, a lower plate element is positioned on a vertical support element and an upper plate element is pivotally mounted to move therefrom in a vertical arc from a horizontal to a generally vertical position by means of a compression spring positioned between these plate elements. The upper plate element is held in its vertical position against the force of the spring by means of a rod member which is pivotable in a vertical arc from a point at the terminal end of the lower plate member and which is rearwardly displaceable therefrom to be engaged by a latch member which is pivotable attached to the upper plate member so as to be pivotable in a horizontal arc. The fishing line is wrapped around the latch, and the sensitivity of the device is adjusted by means of relative positioning of the latch element and the rod. When a fish tugs join the line with sufficient force to disengage the latch from the rod, the upper plate along with the rod and its holder will be forced upwardly to set the hook.

BRIEF DESCRIPTION OF THE DRAWINGS

The present invention is further described with reference to the accompanying drawings in which:

FIG. 3 is view of the latch element of the device of the present invention as seen from line III—III in FIG. 1; and FIG. 4 is a side elevational view of the device of the present invention in its open, activated position.

DETAILED DESCRIPTION

Figure 1:
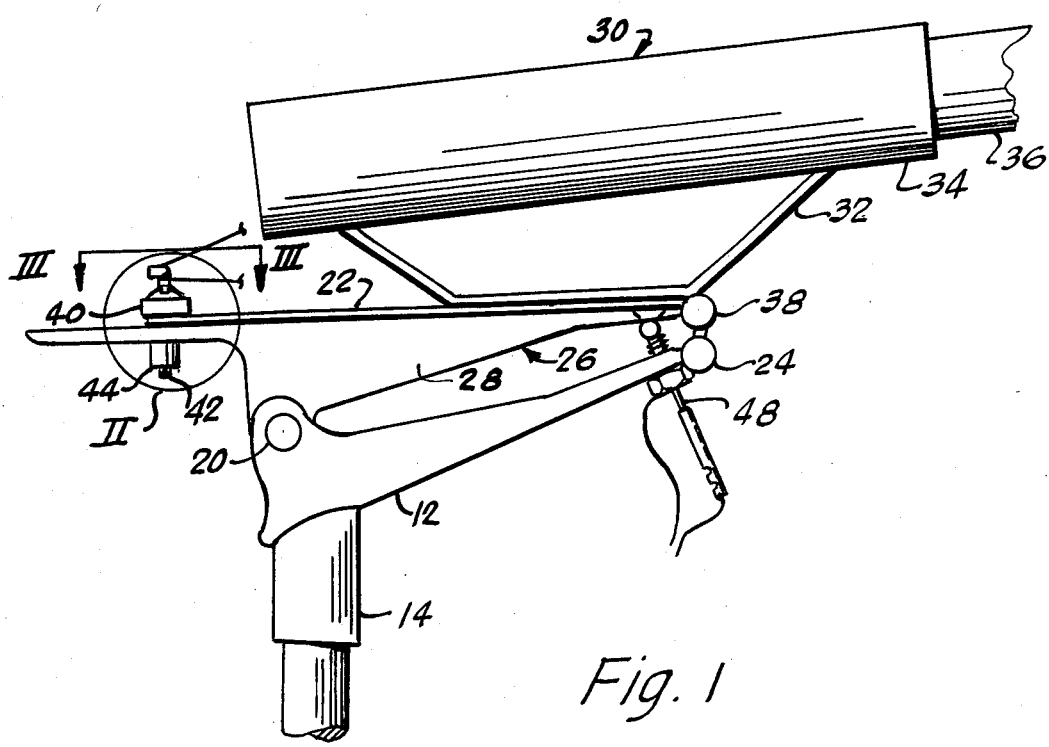
FIG. 1 is a side elevational view of the device of the present invention in its closed, set position.

Referring to the drawings, it will be seen that the fishing rod tender of the present invention includes a vertical support element, shown in fragment a numeral 10, which can be forced into the ground or mounted in a boat gunwale to serve as a base for the device. Superimposed over this vertical support there is a lower plate element shown generally at numeral 12. This lower plate element includes a support engagement tube 14 by means of which it is connected by internal screw threads to the support element 10. The lower plate member also includes dual lateral walls at at 16 for retention of an expandable compression spring 18. At the terminal end of the lower plate member, pin 29 extends laterally, and loosely mounted on this pin so as to be pivotable in a vertical arc there is a rod 22.

Pivotally mounted to the lower plate member by means of pin 20 there is an upper plate member 26. This upper plate member also has opposed lateral walls as at 28 for retention of compression spring 18. It will be noted that the spring 18 is also retained by pin 20.

Superimposed on the upper plate member there is a rod holding element shown generally at numeral 30. This rod holding element is comprised of a base 32 and a tube 34. A fishing rod 36 is shown in fragment being held in this tube.

Referring particularly to FIG. 1. 1, it will be seen that a pin 38 with an enlarged head extends laterally from the terminal end of the upper plate element and that the rod extends rearwardly to be engaged by the latch mechanism.

Figure 2:
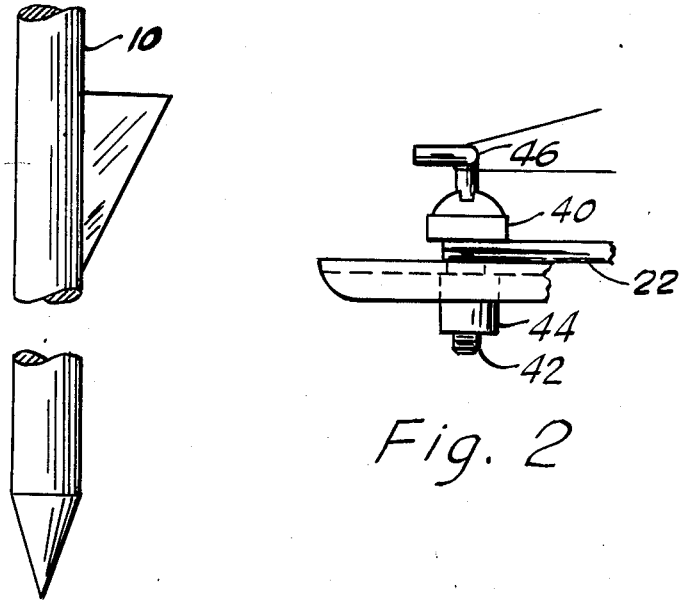
FIG. 2 is an enlarged view of the area within circle II in FIG. 1.

Referring particularly to FIGS. 2 and 3 it will be seen that a latch element 40 pivots on a vertical bolt 42 engaged to the upper plate element by means of nuts as at 44. The latch element pivots in a horizontal arc and a stepped cylindrical extension 46 engages the rod at anyone of a number of positions. The fishing line is wrapped around the stepped extension and if the line is pulled by a fish with sufficient force it will be pivoted in a forward direction to a point to which it is disengaged from an the rod 22. In general, more force will be required to displace the stepped extension from the rod as the stepped extension is positioned further to the rear with respect to the rod.

After the stepped extension is disengaged from the rod, the spring forces the plate members apart until the upper plate member is in the nearly vertical position shown in FIG. 4.

An electrical switch 48 may be used to activate an alarm when the device is activated.

It will thus be appreciated that there has been described a durable rod tender that will accommodate a variety of fishing tackle and which is easily adjustable to various fishing conditions. Although the invention has been described with a certain degree of particularity, it is to be understood that the present disclosure has been made only as an example and that the scope of the invention is defined by what is hereafter claimed.

What is claimed is:

1. A device for automatically setting a fish hook comprising:
   (a) a vertical support element;
   (b) a lower plate element superimposed on said vertical support element and extending outwardly therefrom to a terminal end;
   (c) an upper plate element mounted to the lower plate element to be pivotable through a vertical arc;
   (d) a latch element mounted on the upper plate element to be pivotable in a generally horizontal arc;
   (e) a rod element mounted at the terminal end of the lower plate element to be pivotable in a vertical arc and to be extendable rearwardly to be engaged with the latch element;

(f) an expandable compression spring element positioned between the upper and lower plate elements; and (g) a fishing rod holding pipe element superimposed on the upper plate member such that fishing line may be wrapped around the latch element so that tension on said line will pivot the latch element out of engagement with the rod element to relieve restraint on the spring element and allow the upper plate element to be upwardly displaced in a vertical away from the lower plate element.

2. The device recited in claim 1 wherein the upper and lower plates have opposed lateral walls for retention of the spring element.

3. The device recited in claim 1 wherein the latch element has a cylindrical stepped extension around which the fish line is wrapped.

* * * * *